United States Patent
Abraham et al.

(10) Patent No.: US 7,158,882 B2
(45) Date of Patent: *Jan. 2, 2007

(54) METHOD AND APPARATUS FOR LOCATING POSITION OF A MOBILE RECEIVER

(75) Inventors: Charles Abraham, Los Gatos, CA (US); Frank van Diggelen, San Jose, CA (US)

(73) Assignee: Global Locate, Inc, San Jose, CA (US)

(*) Notice: Subject to any disclaimer, the term of this patent is extended or adjusted under 35 U.S.C. 154(b) by 212 days.

This patent is subject to a terminal disclaimer.

(21) Appl. No.: 10/790,614

(22) Filed: Mar. 1, 2004

(65) Prior Publication Data

US 2005/0192745 A1 Sep. 1, 2005

(51) Int. Cl.
*G01C 21/26* (2006.01)

(52) U.S. Cl. .............. 701/213; 701/207; 342/357.01; 342/357.06; 342/357.12

(58) Field of Classification Search ................ 701/213, 701/215, 207; 455/12.1, 422; 342/357.01, 342/357.02, 357.06, 357.12
See application file for complete search history.

(56) References Cited

U.S. PATENT DOCUMENTS

| | | | | |
|---|---|---|---|---|
| 6,583,756 | B1 * | 6/2003 | Sheynblat | 342/357.02 |
| 2004/0130485 | A1 * | 7/2004 | Rapoport et al. | 342/357.03 |
| 2004/0239558 | A1 * | 12/2004 | Geier et al. | 342/357.06 |
| 2004/0257277 | A1 * | 12/2004 | Abraham et al. | 342/357.09 |
| 2005/0014512 | A1 * | 1/2005 | Gerecht | 455/456.1 |

* cited by examiner

*Primary Examiner*—Gertrude A. Jeanglaude
(74) *Attorney, Agent, or Firm*—Moser IP Law Group

(57) ABSTRACT

A method and apparatus for locating position of a mobile receiver is described. In one example, sets of satellite measurements are determined with respect to a plurality of satellites over a period of time. A determination is made as to whether the mobile receiver is in a stationary condition over the period of time. A position of the mobile receiver is then computed using the sets of satellite measurements in response to detection of the stationary condition.

24 Claims, 3 Drawing Sheets

METHOD AND APPARATUS FOR LOCATING POSITION OF A MOBILE RECEIVER

BACKGROUND OF THE INVENTION

1. Field of the Invention

The present invention generally relates to satellite positioning systems and, more particularly, to locating position of a mobile receiver.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

In some GPS applications, the signal strengths of the satellite signals are so low that it is desirable to perform many pseudorange measurements, which may be used to compute an average position. However, effectiveness of such averaging is limited if the GPS receiver is in motion. Accordingly, it is desirable to dynamically adjust the position location process in response to GPS receiver motion.

SUMMARY OF THE INVENTION

A method and apparatus for locating position of a mobile receiver is described. In one embodiment, sets of satellite measurements are determined with respect to a plurality of satellites over a period of time. For example, the mobile receiver may measure pseudoranges to the satellites or may make Doppler measurements with respect to signals transmitted by the satellites, or both. A determination is made as to whether the mobile receiver is in a stationary condition over the period of time. For example, the mobile receiver may monitor information received from a wireless communication network over the period of time, such as timing advance data. The change in timing advance data over the period of time may be compared to a threshold to determine whether the mobile receiver is in the stationary condition. In another example, the mobile receiver may monitor information received from a motion measurement or motion detection device disposed therein. The change in the information with respect to a given metric associated with the motion measurement or motion detection device may be compared to a threshold to determine whether the mobile receiver is in the stationary condition.

A position of the mobile receiver is then computed using the sets of satellite measurements in response to detection of the stationary condition. In one embodiment, the sets of satellite measurements are processed using a navigation model, the results of which are statistically processed to locate position of the mobile receiver. In another embodiment, the sets of satellite measurements are applied to a sequential estimation filter and position of the mobile receiver is derived therefrom.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
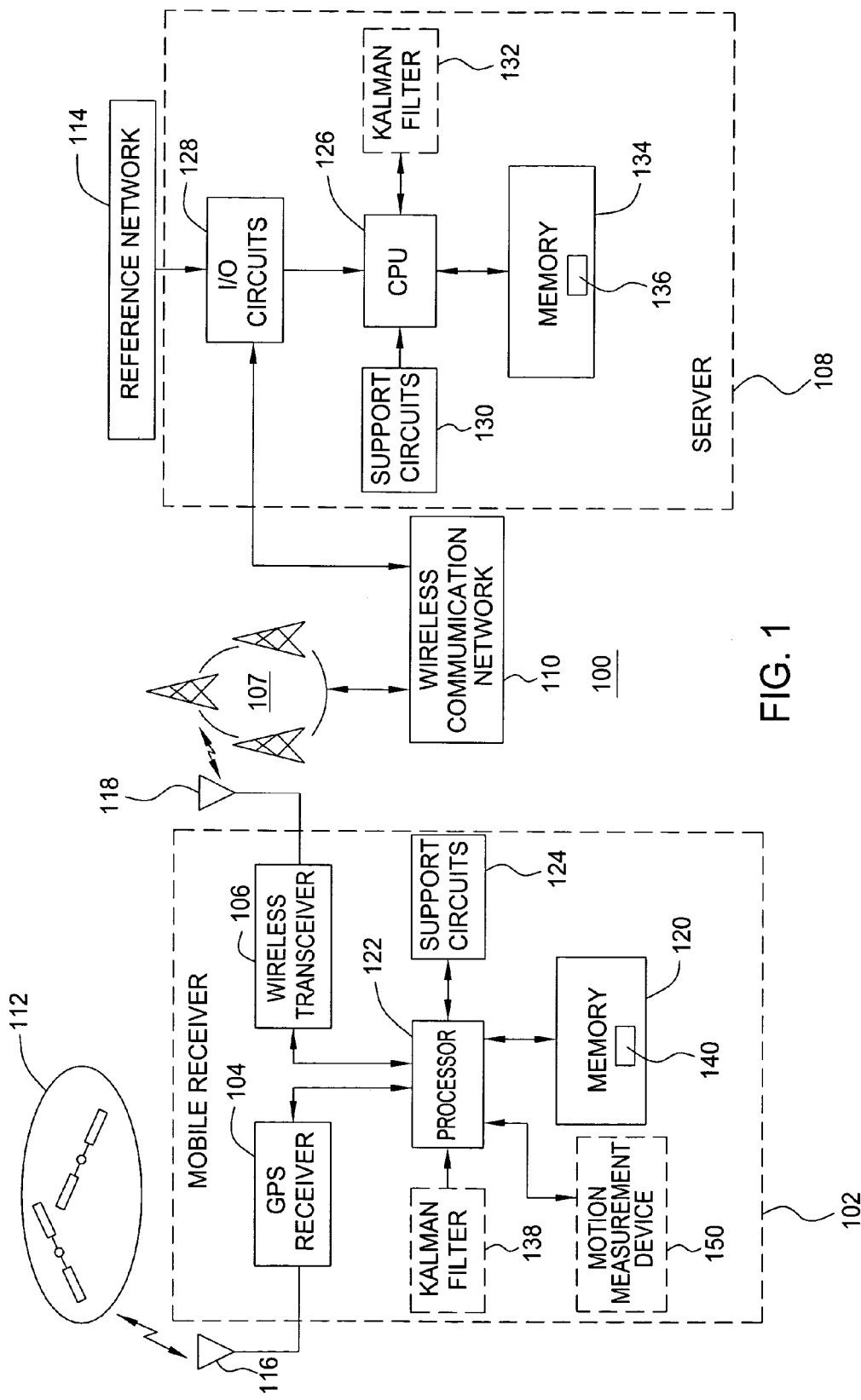
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. For example, the server 108 may be disposed in a serving mobile location center (SMLC) of the wireless communication network 110. The mobile receiver 102 obtains satellite measurement data with respect to a plurality of satellites 112 (e.g., pseudoranges, Doppler measurements). The server 108 obtains satellite navigation data for at least the satellites in view (e.g., orbit trajectory information, such as ephemeris, for the satellites 112). Position information for the mobile receiver 102 is computed using the satellite measurement data and the satellite navigation data.

In one embodiment, the mobile receiver 102 sends the satellite measurement data to the server 108, and the server 108 locates position of the mobile receiver 102 (referred to as the mobile station assisted or "MS-assisted" configuration). In another embodiment, the server 108 sends the satellite navigation data to the mobile receiver 102, and the mobile receiver 102 locates its own position (referred to as the mobile station based or "MS-based" configuration). In yet another embodiment, the mobile receiver 102 may locate its own position by obtaining the satellite navigation data directly from the satellites 112, rather than from the server 108 (referred to as the "autonomous" configuration).

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disc storage, or any combination of such memory devices. The support circuits 130 include conventional cache, power supplies, clock circuits, data registers, I/O interfaces, and the like to facilitate operation of the server 108. In one embodiment, the server 108 includes a sequential estimation filter, such as a Kalman filter 132.

The I/O interface 128 is configured to receive data, such as satellite measurement data collected by the mobile receiver 102, from the wireless network 110. In addition, the I/O interface 128 is configured to receive satellite navigation data, such as ephemeris for at least the satellites 112, from an external source, such as a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety.

In one embodiment of the invention, the server 108 may use the collected satellite navigation data to compute acquisition assistance data for the mobile receiver 102. Acquisition assistance data may be used to assist the mobile receiver 102 in acquiring satellite signals. For example, the acquisition assistance data may include a model of expected pseudoranges, pseudorange rates (e.g., expected Doppler information), and pseudorange accelerations at the mobile receiver 102 ("a pseudorange model"). Exemplary pseudorange models and details of their formation are described in commonly-assigned U.S. Pat. No. 6,453,237, issued Sep. 17, 2002, which is incorporated by reference herein in its entirety. Acquisition assistance data may be employed in either of the MS-assisted or MS-based configurations, described above.

The server 108 may locate position of the mobile receiver 102 using a navigation model in a well-known manner. Notably, in the general satellite navigation problem, there are nine unknowns:

Three position unknowns: x, y, z
Three velocity unknowns: $\dot{x}, \dot{y}, \dot{z}$
Three clock unknowns: $t_c, t_s, f_c$ where $t_c$ is the common mode timing error (usually a sub-millisecond value in GPS), $t_s$ is the absolute time tag error, and $f_c$ is the frequency error in a local oscillator within the mobile receiver 102. One or more of the variables may be known or estimated based on a-priori information (e.g., $t_s$ may known if the mobile receiver 102 is calibrated to precise GPS time). One or more of the unknown variables may be solved for using satellite measurement data from the mobile receiver 102 in a well-known manner. The navigation model may be implemented as software 136 stored in the memory 134 for execution by the CPU 126. Alternatively, the navigation model may be implemented in hardware or a combination of software and hardware, including any number of processors independently executing various programs and dedicated hardware, such as application specific integrated circuits (ASICs), field programmable gate arrays (FPGAs), and the like.

In another embodiment, the server 108 may use a history of information to continuously produce a filtered position result. The incorporation of history relies upon a formal model or an informal set of assumptions regarding the tendency of the mobile receiver 102 to move from position to position. By placing bounds on the motion of the mobile receiver 102 (and the behavior of a clock in the mobile receiver 102), filtering time constants may be selected that adequately track receiver dynamics, yet allow improved accuracy through the averaging process. Another advantage of filtering techniques is that the mobile receiver 102 may continue to operate when insufficient satellite measurements exist to create independent solutions. For purposes of clarity by example, an aspect of the invention is described with respect to a Kalman filter. It is to be understood, however, that other types of sequential estimation filters may be employed that are known in the art, such as Batch Filters.

Notably, the server 108 may use the Kalman filter 132 to locate position of the mobile receiver 102. The Kalman filter 132 includes a plurality of states, such as position states, velocity states, clock states, and frequency states. The server 108 applies satellite measurements to the Kalman filter 132, which is configured to provide position upon request. Multiple measurement sets may be used to update the states of the Kalman filter 132. The update weighs both the current state information and the measurements to produce new state information. The Kalman filter 132 may be implemented using the software 136, dedicated hardware (e.g., ASICs, FPGAs), or a combination of the software 136 and dedicated hardware.

In particular, the Kalman filter 132 employs a linear dynamic model of a discrete GPS system. The GPS system is modeled by several states. In one embodiment, the states may be: position in three dimensions x, y, and z and common mode error. As is well known in the art, more states may be added, e.g. velocity states, clock frequency states, etc., without changing the nature of the current invention nor the description that follows.

A linear dynamic model $\Phi$ of the GPS system relates the states of the Kalman filter 132 at one discrete time interval, represented by the vector $x_k$, to the previous states of the sequential estimation filter, represented by the vector $x_{k-1}$, according to the following relationship:

$$x_k = \Phi_{k-1} x_{k-1} + w_{k-1}, \ E\{ww^T\} = Q,$$

where $w_{k-1}$ is the process noise associated with the dynamic model and Q is the covariance of the process noise (also referred to herein as the "state driving noise"). The matrix Q is a measure of how well $x_k$ is known given $x_{k-1}$ in the absence of measurements from the mobile receiver 102.

The mobile receiver 102 computes a set of measurements $z_k$. In GPS, the relationship between the measurements obtained by the mobile receiver 102 and the states of the Kalman filter 132 is non-linear and may be specified in terms of the following:

$$z_k = h(x_k) + v_k, \ E\{vv^T\} = R,$$

where h denotes the non-linear model, $v_k$ denotes the noise on the satellite measurements, and R is the covariance of the receiver measurement noise.

Each iteration of the Kalman filter 132 begins by predicting the state values at the next time interval as follows:

$$\hat{x}_{k-} = \phi_k \hat{x}_{k-1(+)}, E\{(\hat{x}-x)(\hat{x}-x)^T\} = P,$$

where $\hat{x}_{k-}$ is a vector of the predicted states at one time interval, $\hat{x}_{k-1(+)}$ is a vector of the predicted states at the previous time interval, and P is the covariance of the difference between the predicted states and the current states.

The updated state estimate is used to generate a prediction of the measurements as follows:

$$\hat{z}_k = h_k(\hat{x}_{k-}),$$

where $\hat{z}_k$ is a vector representing the predicted measurements. Simultaneously, the state error covariance is extrapolated as follows:

$$P_k = \Phi_{-1} P_{k-1} \Phi_{k-1}^T + Q_{k-1}.$$

In addition, the Kalman gain matrix is computed as follows:

$$K_k = P_{k-} H_k^T (H_k P_{k-} H_k^T + R_k)^{-1} H_k = \partial h_k / \partial x|_{x=\hat{x}_{k-}},$$

where H denotes a linearized form of the non-linear model h.

The Kalman gain is used to adjust the state estimates based on the difference between the observed and predicted measurements as follows:

$$\hat{x}_{k+} = \hat{x}_{k-} + K_k(z_k - \hat{z}_k).$$

Finally, the a-posteriori state covariance is computed in accordance with the following:

$$P_{k+} = (I - K_k H_k) P_{k-},$$

where I denotes the identify matrix.

The linearized measurement model depends on the measurements being incorporated into the Kalman filter 132. The primary filter inputs are the measurements (e.g., pseudorange measurements) from the mobile receiver 102. In this case, the matrix H contains the line of sight vector, as is well understood by those skilled in the art.

The mobile receiver 102 illustratively comprises a GPS receiver 104, a wireless transceiver 106, a processor 122, support circuits 124, and a memory 120. The mobile receiver 102 may also include a Kalman filter 138. The GPS receiver 104 receives satellite signals from the satellites 112 using an antenna 116. The GPS receiver 204 may comprise a conventional GPS receiver, as described in U.S. Pat. No. 4,968,891, issued Nov. 6, 1990. Alternatively, the GPS receiver 204 may comprise an assisted-GPS receiver, such as that described in U.S. Pat. No. 6,453,237. The wireless transceiver 106 receives a wireless signal from a base station 107 of the wireless communication network 110 via an antenna 118. The GPS receiver 104 and the wireless transceiver 106 may be controlled by the processor 122.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. The support circuits 124 include conventional cache, power supplies, clock circuits, data registers, I/O interfaces, and the like to facilitate operation of the mobile receiver 102.

The mobile receiver 102 may locate its own position using a navigation model, as described above with respect to the server 108. Alternatively, the mobile receiver 102 may locate its own position using the Kalman filter 138 in a manner similar to the server 108. The navigation model and the Kalman filter 138 may be implemented using software 140 stored in the memory 120, dedicated hardware (e.g., ASICs, FPGAs), or a combination of the software 140 and dedicated hardware.

In accordance with one or more aspects of the invention, the position computation process performed by the position location system 100 may be adjusted for better performance when the mobile receiver 102 is in a stationary condition. Notably, if the mobile receiver 102 is determined to be in a stationary condition, then multiple position results may be statistically processed to produce a single position result to improve accuracy. For example, multiple sets of satellite measurement data may be processed using a navigation model to generate multiple position results. The multiple position results may then be statistically processed to locate position for the mobile receiver 102. For example, the multiple position results may be averaged to generate an average position. The term "average," as used herein, is meant to encompass various types of averaging techniques known in the art, such as weighted averaging. In addition, the multiple position results may be processed using other statistical processing techniques known in the art, such as a mean computation, a median computation, and the like. In another example, a sequential estimation filter (e.g., Kalman filters 132 and 138) may be configured with a decreased state driving noise with respect to a nominal value. Multiple sets of satellite measurement data may be applied to the sequential estimation filter to generate a filtered position result.

In one embodiment of the invention, the mobile receiver 102 may determine its state of motion using information from a wireless signal received by the wireless transceiver 106. In one embodiment, the wireless communication network 110 may be a time division multiple access (TDMA) network, such as a global systems for mobile communications (GSM) networks, universal mobile telecommunications system (UMTS) networks, North American TDMA networks (e.g., IS-136), and personal digital cellular (PDC) networks. The mobile receiver 102 may determine its state of motion using timing advance data provided by the base station 107.

Notably, TDMA communication systems compensate for the effect of propagation delays by synchronizing the arrival of transmissions from variously located mobile receivers to the slotted frame structures used by base stations. In order to synchronize transmissions from mobile receivers located in a base station service area, the base station typically transmits a timing advance (TA) value to each mobile receiver. A given mobile receiver advances its transmissions to the base station according to the TA value to compensate for the propagation delay between the mobile receiver and the base station. Typically, the TA values instruct the mobile receivers to advance their uplink transmissions such that the transmissions from all the mobile receivers served by a base station arrive at the base station in synchronism with a common receive frame structure.

For example, TDMA systems may utilize a random access channel (RACH) to receive an access request burst from an unsynchronized mobile receiver and use propagation delay gained from the receive RACH burst to determine an appropriate TA value for the mobile receiver. Upon start-up, or handoff to a new base station, an unsynchronized mobile receiver searches for and receives a control channel (e.g., common control channel (CCCH) in a GSM system) from the base station that provides an initial timing reference. To initiate use of the base station, the mobile receiver then transmits a RACH burst at a predetermined time in relation to the control channel timing reference. Upon receipt of the RACH burst, the base station can determine round-trip time delay based on the delay between transmission of the control channel timing reference and receipt of the RACH burst. The base station uses this round-trip time delay to determine an appropriate TA value for the mobile receiver.

For example, in a GSM system, once a connection has been established between a mobile receiver and a base station, the base station continues to measure the time offset between its own burst schedule and bursts received from the mobile receiver. Based on these measurements, the base station periodically provides the mobile receiver with timing advance information in the form of a 6-bit TA value transmitted on the slow associated control channel (SACCH) at a rate of twice per second. The base station estimates round-trip delay on the RACH, and uses this estimated round-trip delay to determine the appropriate TA value to send to the mobile receiver. Typically the TA value sent by the base station corresponds to the absolute delay between the base station and the mobile receiver in terms of the number of bit periods. In GSM, the 6-bit TA value provides a range of from 0 bit periods to 63 bit periods of advance, with a resolution of 1 bit period. Timing advance mechanisms for other types of TDMA systems (e.g., IS-136, PDC, and UMTS) are similar to that of GSM and are well-known in the art.

Figure 2:
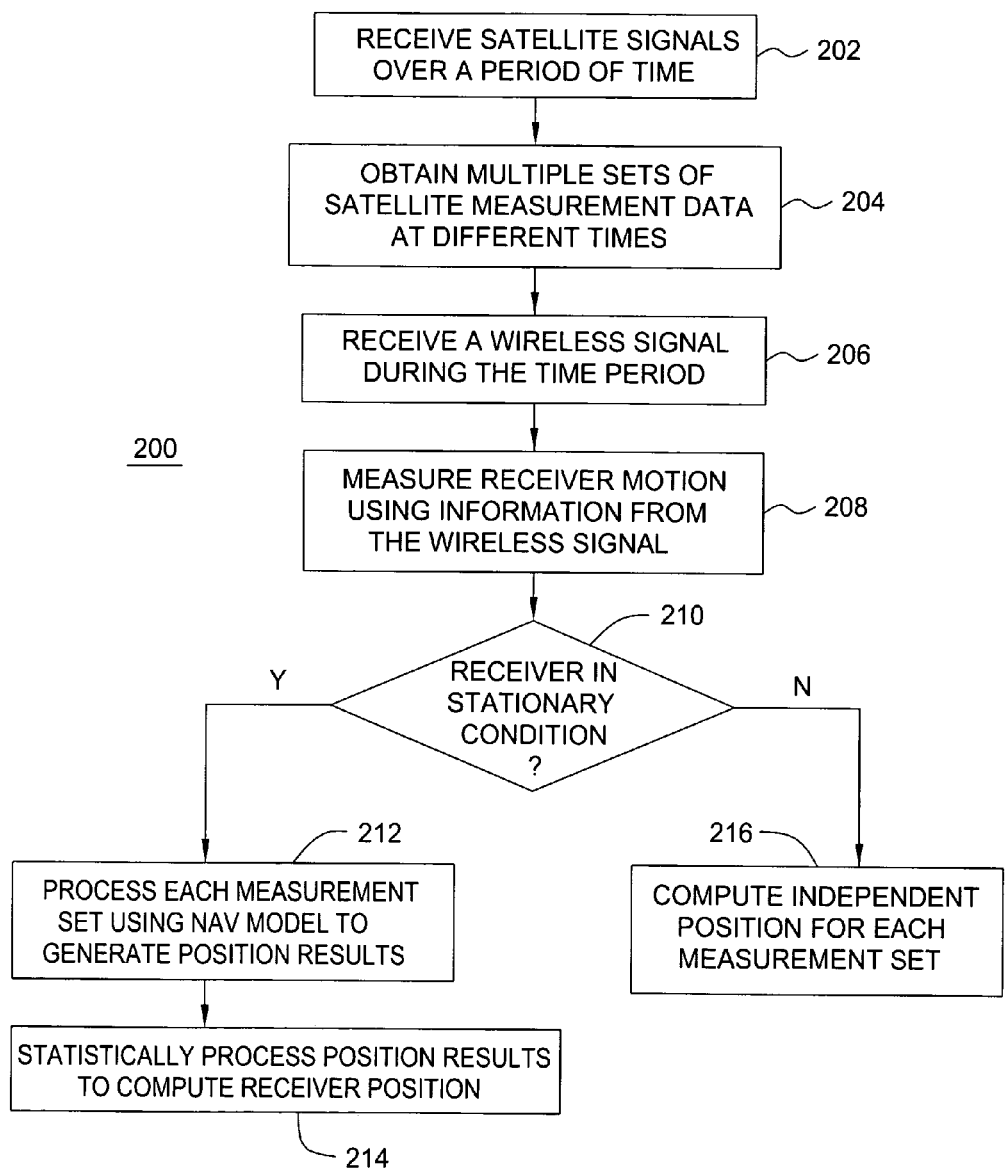
FIG. 2 is a flow diagram depicting an exemplary embodiment of a process for locating position of a mobile receiver in communication with a wireless network.

FIG. 2 is a flow diagram depicting an exemplary embodiment of a process 200 for locating position of a mobile receiver in communication with a wireless network. One or more aspects of the process 200 may be understood with reference to the position location system 100 of FIG. 1. The process 200 begins at step 202, where satellite signals are received over a period of time. At step 204, multiple sets of satellite measurements are obtained at different times over the time period. That is, multiple sets of satellite measurements are determined, where each measurement set corresponds to a particular time. For example, each measurement set may include pseudoranges, Doppler measurements, or both. Each set of measurements does not have to be associated with the same plurality of satellites. For example, two sets of measurements may be associated with two different sets of satellites. Alternatively, some of the measurements among two measurement sets may be associated with the same satellites, while others of the measurements among the two measurement sets may be associated with different satellites.

At step 206, a wireless signal is received at the mobile receiver 102 during the time period. At step 208, motion of the mobile receiver 102 is measured using information from the wireless signal. For example, TA data received from the base station 107 may be used to determine receiver motion. At step 210, a determination is made as to whether the mobile receiver 102 is in a stationary condition. Whether or not the mobile receiver 102 is in a stationary condition may be defined with respect to a predefined threshold.

For example, by monitoring TA values received from the base station 107 over the time period, a determination may be made as to whether the mobile receiver 102 is in a stationary condition. If the change in the TA values over the time period is below a predefined threshold, the mobile receiver 102 is deemed to be in a stationary condition. For example, the difference between the maximum TA value and the minimum TA value received over the time period may be compared to a pre-defined threshold around zero to determine whether or not the mobile receiver is in the stationary condition. In a GSM system, for example, the threshold may be defined with respect to a particular number of bit-periods (e.g., ±x bit-periods of change between the maximum and minimum TA values).

If at step 210 the mobile receiver is in a stationary condition, the process 200 proceeds to step 212. At step 212, each measurement set is processed using a navigation model to generate multiple position results. At step 214, the multiple position results are statistically processed (e.g., averaged) to compute a position for the mobile receiver. In one embodiment, the measurement sets are processed within the mobile receiver 102. Alternatively, the measurement sets may be transmitted to the server 108 for processing along with data indicative of the detection of the stationary condition. If at step 210 a determination is made that the mobile receiver is not in a stationary condition, the process 200 proceeds to step 216. At step 216, an independent position is computed for each of the measurement sets. That is, a combined position is not computed, but rather an individual position is computed using each measurement set. The position computation may be performed in either the mobile receiver 102 or the server 108.

Figure 3:
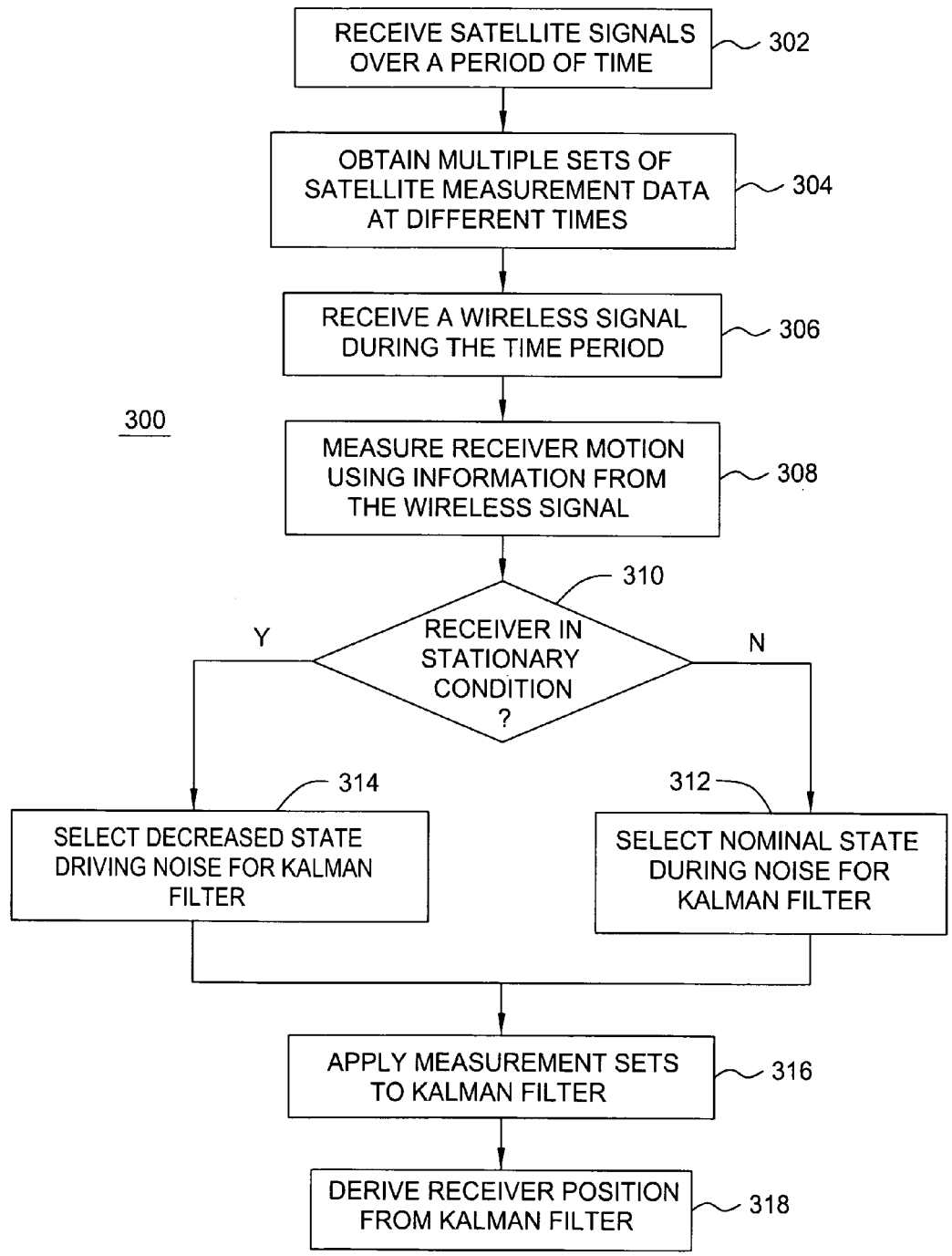
FIG. 3 is a flow diagram depicting another exemplary embodiment of a process for location position of a mobile receiver in communication with a wireless communication network.

FIG. 3 is a flow diagram depicting another exemplary embodiment of a process 300 for location position of a mobile receiver in communication with a wireless communication network. One or more aspects of the process 300 may be understood with reference to the position location system 100 of FIG. 1. The process 300 begins at step 302, where satellite signals are received over a period of time. At step 304, multiple sets of satellite measurements are obtained at different times over the time period, as described above. At step 306, a wireless signal is received at the mobile receiver 102 during the time period. At step 308, motion of the mobile receiver 102 is measured using information from the wireless signal. For example, TA data received from the base station 107 may be used to determine whether the mobile receiver 102 is in a stationary condition, as described above with respect to the process 200.

At step 310, a determination is made as to whether the mobile receiver 102 is in a stationary condition. If not, the process 300 proceeds to step 312. At step 312, a Kalman filter (e.g., Kalman filter 132 or 138) is configured with a nominal state driving noise. The nominal state driving noise is selected to be commensurate with actual state dynamics with respect to the mobile receiver. If, at step 310, a determination is made that the mobile receiver 102 is in a stationary condition, the process 300 proceeds to step 314. At step 314, a Kalman filter is configured with a decreased state driving noise. That is, the state driving noise is decreased from the nominal level. By decreasing the state driving noise, the Kalman filter is configured to perform more averaging than would be done with a nominal state driving noise. From steps 312 and 314, the process 300 proceeds to step 316. At step 316, the measurement sets are applied to the Kalman filter. At step 318, a position for the mobile receiver is derived from the Kalman filter. In one embodiment, the Kalman filter 138 within the mobile receiver 102 may be employed. Alternatively, the measurement sets and data indicative of whether the mobile receiver 102 is in the stationary condition is transmitted to the server 108, and the Kalman filter 132 is employed.

For purposes of clarity by example, the processes and methods herein have been described with respect to detection of motion using timing advance information derived from a wireless signal. It is to be understood, however, that the mobile receiver 102 may determine its motion state using a motion measurement device 150. The motion measurement device 150 may comprise an accelerometer, a speedometer, and like-type motion measurement and motion detection devices known in the art. In such embodiments, a threshold may be established to delineate whether the mobile receiver 102 is in a stationary condition in accordance with a given metric associated with the motion measurement device 150.

In the preceding discussion, the invention has been described with reference to application upon the United States Global Positioning System (GPS). It should be evident, however, that these methods are equally applicable to similar satellite systems, and in particular, the Russian GLONASS system and the European GALILEO system. The term "GPS" used herein includes such alternative satellite positioning systems, including the Russian GLONASS system and the European GALILEO system.

While the foregoing is directed to illustrative embodiments of the present invention, other and further embodiments of the invention may be devised without departing from the basic scope thereof, and the scope thereof is determined by the claims that follow.

The invention claimed is:

1. A method of locating position of a mobile receiver, comprising:
   determining sets of satellite measurements with respect to a plurality of satellites over a period of time;
   detecting whether said mobile receiver is in a stationary condition over said period of time; and
   computing a position of said mobile receiver using said sets of satellite measurements in response to detection of said stationary condition.

2. The method of claim 1, wherein said detecting step comprises:
   monitoring information received from a wireless communication network at said mobile receiver over said period of time.

3. The method of claim 2, wherein said information comprises a plurality of timing advance values obtained at a respective plurality of times.

4. The method of claim 3, wherein said monitoring step comprises:
   computing a difference between a maximum of said plurality of timing advance values and a minimum of said plurality of timing advance values;
   where said stationary condition is detected in response to said difference being within a threshold of zero.

5. The method of claim 1, wherein said computing step is performed at said mobile receiver.

6. The method of claim 1, further comprising:
   transmitting said sets of satellite measurements and data indicative of said detection of said stationary condition to a server in wireless communication with said mobile receiver;
   wherein said computing step is performed at said server.

7. The method of claim 1, wherein said computing step comprises:
   processing each of said sets of satellite measurements using a navigation model to generate a plurality of results; and
   statistically processing said plurality of results to determine said position.

8. The method of claim 7, wherein said plurality of results are averaged to determine said position.

9. The method of claim 1, wherein said computing step comprises:
   applying each of said sets of satellite measurements to a sequential estimation filter to generate said position.

10. The method of claim 9, wherein said computing step further comprises:
    configuring said sequential estimation filter with a decreased state driving noise with respect to a nominal value.

11. The method of claim 10, wherein said sequential estimation filter is a Kalman filter.

12. The method of claim 1, wherein said detecting step comprises:
    monitoring information generated by a motion measurement device over said period of time.

13. Apparatus for locating position of a mobile receiver, comprising:
    a satellite signal receiver for determining satellite measurements with respect to a plurality of satellites;
    a means for detecting motion of said mobile receiver; and
    a processor for monitoring information generated by said detecting means to determine whether said mobile receiver is in a stationary condition, and computing a position of said mobile receiver using sets of said satellite measurements determined over said period of time in response to detection of said stationary condition.

14. The apparatus of claim 13, wherein said means for detecting comprises a wireless transceiver configured to receive a wireless signal from a wireless communication network.

15. The apparatus of claim 14, wherein said information comprises a plurality of timing advance values obtained at a respective plurality of times.

16. The apparatus of claim 13, wherein said processor is configured to process each of said sets of satellite measurements using a navigation model to generate a plurality of results, and statistically process said plurality of results to determine said position.

17. The apparatus of claim 13 further comprising:
    a sequential estimation filter;
    wherein said processor is configured to compute said position by applying each of said sets of satellite measurements to said sequential estimation filter.

18. The apparatus of claim 17, wherein said sequential estimation filter is a Kalman filter.

19. The apparatus of claim 13, wherein said means for detecting comprises a motion measurement device.

20. A position location system, comprising:
    a mobile receiver having a satellite signal receiver for determining satellite measurements with respect to a plurality of satellites and a wireless transceiver; and
    a server in wireless communication with said wireless transceiver;
    where said mobile receiver is configured to monitor information derived from a wireless signal received using said wireless transceiver over a period of time to detect whether said mobile receiver is in a stationary condition;
    where said mobile receiver is further configured to transmit sets of said satellite measurements determined over said period of time and data indicative of said detection of said stationary condition to said server; and where said server is configured to compute a position of said mobile receiver using said sets of satellite measurements in response to said data.

21. The position location system of claim 20, wherein said information comprises a plurality of timing advance values obtained at a respective plurality of times.

22. The position location system of claim 20, wherein the server includes a sequential estimation filter, said server being configured to apply said sets of satellite measurements to said sequential estimation filter.

23. The position location system of claim 22, wherein said sequential estimation filter is a Kalman filter.

24. The position location system of claim 20, wherein said server is configured to process each of said sets of satellite measurements using a navigation model to generate a plurality of results, and statistically process said plurality of results to determine said position.

* * * * *

UNITED STATES PATENT AND TRADEMARK OFFICE
CERTIFICATE OF CORRECTION

PATENT NO. : 7,158,882 B2
APPLICATION NO. : 10/790614
DATED : January 2, 2007
INVENTOR(S) : Abraham et al.

It is certified that error appears in the above-identified patent and that said Letters Patent is hereby corrected as shown below:

On the Title page, in Item (73), in "Assignee", in column 1, line 1, delete "San Jose, CA" and insert -- 3910 S. Bascom, Suite 260, San Jose, CA 95124 --, therefor.

In column 4, line 50, delete "$\{ww^t\}$" and insert -- $\{ww^T\}$ --, therefor.

Signed and Sealed this

Third Day of April, 2007

JON W. DUDAS
*Director of the United States Patent and Trademark Office*